United States Patent
Sung et al.

(10) Patent No.: US 9,543,568 B2
(45) Date of Patent: Jan. 10, 2017

(54) ELECTRODE INCLUDING MULTI-LAYERED ELECTRODE ACTIVE MATERIAL LAYER AND SECONDARY BATTERY INCLUDING THE SAME

(71) Applicant: LG Chem, Ltd., Seoul (KR)

(72) Inventors: Nak Gi Sung, Chungcheongnam-do (KR); Duk Hyun Ryu, Daejeon (KR); Cha Hun Ku, Daejeon (KR); Jung Jin Kim, Daejeon (KR); Hye Lim Shim, Daejeon (KR)

(73) Assignee: LG Chem, Ltd. (KR)

( * ) Notice: Subject to any disclaimer, the term of this patent is extended or adjusted under 35 U.S.C. 154(b) by 266 days.

(21) Appl. No.: 13/856,049

(22) Filed: Apr. 3, 2013

(65) Prior Publication Data

US 2013/0224584 A1 Aug. 29, 2013

Related U.S. Application Data

(63) Continuation of application No. PCT/KR2012/003439, filed on May 2, 2012.

(30) Foreign Application Priority Data

May 2, 2011 (KR) .................. 10-2011-0041438

(51) Int. Cl.
```
H01M 4/13      (2010.01)
H01M 4/04      (2006.01)
H01M 4/139     (2010.01)
H01M 10/0525   (2010.01)
H01M 4/131     (2010.01)
H01M 4/1391    (2010.01)
H01M 4/02      (2006.01)
```
(52) U.S. Cl.
CPC ............ *H01M 4/13* (2013.01); *H01M 4/0404* (2013.01); *H01M 4/139* (2013.01); *H01M 10/0525* (2013.01); *H01M 4/131* (2013.01); H01M 4/1391 (2013.01); H01M 2004/021 (2013.01); Y02E 60/122 (2013.01); Y02P 70/54 (2015.11)

(58) Field of Classification Search
CPC ......... H01M 4/04; H01M 4/0404; H01M 4/13
USPC ..................... 429/209, 211; 427/58
See application file for complete search history.

(56) References Cited

U.S. PATENT DOCUMENTS

| | | |
|---|---|---|
| 2006/0251965 A1 | 11/2006 | Nagayama et al. |
| 2010/0248027 A1 | 9/2010 | Zhang et al. |
| 2011/0020703 A1 | 1/2011 | Suzuki et al. |

FOREIGN PATENT DOCUMENTS

| | | | |
|---|---|---|---|
| CN | 1830102 A | 9/2006 | |
| CN | 101859885 A | 10/2010 | |
| CN | 101981728 A | 2/2011 | |
| JP | 09320569 A | * 12/1997 | ............ H01M 10/40 |
| JP | 9320569 A | 12/1997 | |
| JP | 2005050755 A | 2/2005 | |
| JP | 2009009858 A | 1/2009 | |
| JP | 2009099495 A | * 5/2009 | .......... H01M 10/052 |

OTHER PUBLICATIONS

International Search Report for Application No. PCT/KR2012/003439 dated Dec. 3, 2012.
Office Action from corresponding Chinese Application No. 201280003525, dated Jun. 9, 2015.
Office Action from corresponding Chinese Application No. 201280003525, dated Dec. 22, 2015.

* cited by examiner

*Primary Examiner* — Karie O'Neill Apicella
(74) *Attorney, Agent, or Firm* — Lerner, David, Littenberg, Krumholz & Mentlik, LLP

(57) ABSTRACT

The present invention relates to an electrode comprising multi-layered electrode active material layer and a secondary battery comprising the same. According to the embodiments of the present invention comprises electrode having multi-layered electrode active material layer, wherein the content of the active materials which forms the electrode active material layers is equally maintained and the loading amounts at each layer are either the same or different from each other, thereby solving the problem of performance deterioration caused by an increase in battery resistance due to non-uniform dispersion of a binder or the like.

11 Claims, No Drawings

ELECTRODE INCLUDING MULTI-LAYERED ELECTRODE ACTIVE MATERIAL LAYER AND SECONDARY BATTERY INCLUDING THE SAME

CROSS-REFERENCE TO RELATED APPLICATIONS

This application is a continuation of International Application No. PCT/KR2012/003439 filed on May 2, 2012, published in Korean, which claims the priority of Korean Patent Application No. 10-2011-0041438 filed on May 2, 2011, in the Korean Intellectual Property Office, the disclosure of which is incorporated herein by reference.

TECHNICAL FIELD

The present invention relates to an electrode including a multi-layered electrode active material layer and a secondary battery including the same, and more particularly to a secondary battery having an improved performance by decreasing a battery resistance by forming an electrode active layer as a multi-layered coating layer for the uniform dispersion of an electrode active material and a binder resin.

BACKGROUND ART

Recently, as electronic devices are miniaturized and lightened and the portable electronic devices are generally used, researches on lithium secondary batteries having a high energy density are actively conducted.

A lithium secondary battery uses a material possibly conducting an intercalation and a deintercalation of lithium ions, in a negative electrode and a positive electrode, and is manufactured by filling up an organic electrolyte or a polymer electrolyte between the positive electrode and the negative electrode. Through the oxidation and reduction conducted during the intercalation and the deintercalation of the lithium ions into and from the positive electrode and the negative electrode, an electric energy may be generated.

The negative electrode and the positive electrode may include an electrode active material layer on a collector of each electrode. For example, the electrode may be manufactured by preparing slurry by mixing an electrode active material, a binder and a solvent optionally along with a conductive material and a dispersing agent and stirring, coating the thus obtained slurry on a collector made of metal, pressurizing and drying.

The binder may include, for example, polytetrafluoroethylene (PTFE), polyvinylidene fluoride (PVdF), etc., and the conductive material may commonly use carbon black.

Generally, the negative electrode and the positive electrode may be obtained by coating once electrode slurry on the collector of each electrode. In this case, the binder included in the electrode slurry may not be dispersed uniformly on the coated electrode active material layer, but may be dispersed at the surface of the electrode active material layer. In this case, binder may increase the resistance of the battery to deteriorate the performance of the battery.

This problem may be intensified as the loading amount of the electrode active material increases. Therefore, a method for solving this defect is required in order to develop a high capacity lithium secondary battery.

DISCLOSURE OF THE INVENTION

Technical Problem

An object of the present invention is to solve the above-described defects and to provide an electrode in which a binder, etc. may not be dispersed at the surface of an electrode active material layer or exfoliated from an electrode active material layer coated on an electrode collector but may be uniformly dispersed, and a secondary battery including the same.

Technical Solution

To achieve these and other advantages, there is provided an electrode including a multi-layered electrode active material layer.

In the multi-layered electrode active material layer, a loading amount of an electrode active material in each layer of the multi-layered electrode active material layer may be different from each other.

In addition, the loading amount increases as the layer becomes higher with respect to an electrode collector.

In addition, the loading amount decreases as the layer becomes higher with respect to an electrode collector.

In addition, the loading amount of each layer may be the same.

In addition, an electrode active material in each layer may comprise different electrode active material components.

The electrode active material in the layer in contact with an electrode collector may have a higher electric conductivity than the electrode active material in other layers of the multi-layered electrode active material layer.

In addition, the electrode active material in the layer which forms a surface of an electrode may have a higher electric conductivity than the electrode active material in other layers of the multi-layered electrode active material layer.

In addition, the electrode active material in the layer in contact with the electrode collector may be the same as the electrode active material in the layer which forms the surface of the electrode in the multi-layered electrode active material layer.

In addition, the electrode active material in each layer of the multi-layered electrode active material layer may be made up of the same electrode active material.

In addition, each layer in the multi-layered electrode active material layer may include a conductive material.

The electrode active material in the layer in contact with an electrode collector may include more amounts of the conductive material than the electrode active material in other layers of the multi-layered electrode material layer.

The electrode active material in the layer which forms the surface of the electrode may include more amounts of the conductive material than the electrode active material in other layers of the multi-layered electrode material layer.

Meanwhile, the electrode may be a positive electrode.

In this case, a total loading amount of a multi-layered positive electrode active material constituting the positive electrode may be 540 mg/25 cm$^2$ to 650 mg/25 cm$^2$.

Meanwhile, the electrode may be a negative electrode.

In this case, a total loading amount of a multi-layered negative electrode active material constituting the negative electrode may be 280 mg/25 cm$^2$ to 340 mg/25 cm$^2$.

There is also provided in the present invention a lithium secondary battery including the electrode.

There is also provided in the present invention a method of manufacturing an electrode including a multi-layered electrode active material including (a) preparing an electrode active material; (b) coating a determined loading amount of the electrode active material on an electrode collector; (c) vacuum drying the electrode active material coated on the electrode collector; and (d) repeating the steps (b) and (c) for n times (2≤n≤5).

In this case, the determined loading amount at the step (b) may be different for every repeating times.

In addition, the determined loading amount at the step (b) may be a loading amount obtained by dividing a total amount of the electrode active material by said n.

In this case, a total amount of the electrode active material for the positive electrode active material may be 540 mg/25 cm$^2$ to 650 mg/25 cm$^2$.

In addition, a total loading amount of the electrode active material for the negative electrode active material may be 280 mg/25 cm$^2$ to 340 mg/25 cm$^2$.

Advantageous Effects

According to example embodiments of the present invention, the increase of the volume and weight of an electrode and a secondary battery including the electrode may be prevented while the content of an active material forming an electrode active material layer may be maintained. In addition, a binder may be dispersed uniformly in the electrode active material layer by providing electrodes including a multi-layered electrode active material layer including the same or different loading amount for each floor. Thus, the non-uniform dispersion and exfoliation of the binder in the electrode active material may be prevented as described above, and thus, the increase of the resistance of an electrode may be improved, and the performance of a secondary battery including the electrode may be improved.

MODE FOR CARRYING OUT THE INVENTION

Hereinafter, the present invention will be described in more detail.

The terminology used herein is for the purpose of describing particular example embodiments only and is not intended to limit the present inventive concept. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components and/or groups thereof, but do not preclude the presence or addition of one or more other features, integers, steps, operations, elements, components, and/or groups thereof.

The electrode of the present invention is characterized in that an electrode comprises a multi-layered electrode active material layer. In addition, a lithium secondary battery comprising the electrode having the above-described characteristics also is provided in the present invention.

In an example embodiment of the present invention, the electrode may be at least one selected among a positive electrode and a negative electrode. That is, both of the negative electrode and/or the positive electrode may include the multi-layered electrode active material layer, or one among the negative electrode and/or the positive electrode may include the multi-layered electrode active material layer, without limitation, appropriately as occasion demands.

The present invention is characterized in that the electrode active material is multi-coated on a collector to form a multi-layered structure as described above. Through coating the active material into the multi-layered structure as described above, the binder may be uniformly dispersed in the active material as a whole even when the binder in one electrode active layer is separated or detached to the surface of corresponding active material layer. Therefore, the binder is uniformly dispersed in the electrode active material as a whole, and the separation of the binder from the electrode active material, the increase of the resistance applied to the electrode due to the separation, and the deteriorating phenomenon of the electrode, etc. may be prevented.

That is, when the electrode active material is coated into a multi-layered structure, the separation of the binder from the active material may be prevented without adding a separate apparatus or constitution, and the function of the secondary battery may be largely improved.

As described above, the electrode active material may be coated on an electrode collector in a multi-layered structure by multi-coating in the present invention and so, the multi-layered structure may be always favorable to a single layered active material layer formed on the electrode collector. Thus, the amount of the electrode active material loaded on the electrode collector may not be limited to a specific amount.

Only when the electrode is the positive electrode, and when the loading amount of the negative electrode active material is 540 mg/25 cm$^2$ or more, the positive electrode may be preferably formed into a multi-layered structure by multi-coating the positive electrode active material considering the outer diameter of a battery, the discharge capacity of the positive electrode active material used, the porosity, the loaded thickness of the corresponding positive electrode, a rolled density affecting the physical property of the collector, etc. More preferably, the positive electrode active material may be preferably formed into a multi-layered structure by multi-coating the positive electrode active material more than twice when the total loading amount of the positive electrode active material is 540 mg/25 cm$^2$ to 650 mg/25 cm$^2$.

In this case, the loading amount of the positive electrode active material in each layer may be the same or different. However, the positive electrode active material having a multi-layered structure may have a uniform loading amount of the positive electrode active material for a uniform dispersion.

When the loading amount of the electrode active material in each layer of the electrode including the multi-layered electrode active material is different, the loading amount in each layer may be increased as the layer becomes higher with respect to the electrode collector. That is, the total loading amount of the positive electrode active material coated on the positive electrode collector is as determined above, and the multi-layered positive electrode active material may be formed by following condition of "the loading amount of the first positive electrode active material coated on the positive electrode collector<the loading amount of the second positive electrode active material coated on the first positive electrode active material<the loading amount of the third positive electrode active material coated on the second positive electrode active material."

For example, when the loading amount of the first positive electrode active material layer coated on the positive electrode collector is 100 mg/25 cm$^2$, the loading amount of the second positive electrode active material layer coated on the first positive electrode active material layer may be 200 mg/25 cm$^2$, and the loading amount of the third positive electrode active material layer coated on the second positive electrode active material layer may be 300 mg/25 cm$^2$.

The number of the layers of the positive electrode active material layer is not specifically limited, but may be appropriately selected within the total loading amount of the active material coated on the positive electrode active material layer.

In addition, when the loading amount of the electrode active material in each layer of the multi-layered electrode active material layer is different, the amount in each layer may be decreased as the layer becomes higher with respect to the electrode collector.

That is, the total loading amount of the positive electrode active material coated on the positive electrode collector is as determined above, and may be formed under the condition of "the loading amount of the first positive electrode active material coated on the positive electrode collector>the loading amount of the second positive electrode active amount coated on the first positive electrode active material>the loading amount of the third positive electrode active material coated on the second positive electrode active material."

For example, when the loading amount of the first positive electrode active material layer coated on the positive electrode collector is 250 mg/25 cm$^2$, the loading amount of the second positive electrode active material layer coated on the first positive electrode active material layer may be 200 mg/25 cm$^2$, and the loading amount of the third positive electrode active material layer coated on the second positive electrode active material layer may be 150 mg/25 cm$^2$.

The number of the layers of the positive electrode active material layer is not specifically limited, but may be appropriately selected only if satisfying the total loading amount of the active material coated on the positive electrode active material layer.

That is, in the multi-layered positive electrode active material layer structure, the concentration of the positive electrode active material layer may be increased or decreased as the layer becomes higher with respect to the positive electrode collector.

In addition, in example embodiments, the loading amount of the positive electrode active material in each layer of the multi-layered positive electrode active material may be the same. That is, the loading amount of each positive electrode active material layer coated on each layer may be the same. In this case, the number of the positive electrode active material layer is not specifically limited, but may be appropriately selected only if satisfying the loading amount of the total positive electrode active material.

The positive electrode of the present invention may include the multi-layered positive electrode active material layer as described above on the positive electrode collector.

Here, the positive electrode collector may be a metal having a high conductivity and may be any metal easily attachable to a positive electrode active material slurry without limitation. Particularly, a foil manufactured by using aluminum, nickel or a combination thereof, may be used without limitation.

In addition, the positive electrode active material may be a common positive electrode active material applicable in a positive electrode of a conventional electrochemical device, for example, a lithium intercalation material such as a complex oxide obtained from a lithium manganese oxide, a lithium cobalt oxide, a lithium nickel oxide, a lithium iron oxide or a combination thereof including $LiCoO_2$, $LiNiO_2$, $LiClO_4$, $LiCF_3SO_3$, $LiPF_6$, $LiBF_4$, $LiAsF_6$, $LiN(CF_3SO_2)_2$ or $LiMn_2O_4$, etc., without limitation.

The conductive material may include any electro conductive material which may not undergo a chemical change in a constituted battery. For example, carbon black such as acetylene black, ketchen black, furnace black, thermal black, etc.; natural graphite, synthetic graphite, a conductive carbon fiber, and the like may be used. Particularly, the carbon black, a graphite powder, the carbon fiber may be preferably used.

The binder may include one of a thermoplastic resin and a thermosetting resin, or a combination thereof. Among the above kinds, polyvinylidene fluoride (PVdF) or polytetrafluoroethylene (PTFE) may be preferred.

In addition, isopropyl alcohol, N-methylpyrrolidone (NMP), acetone, etc. may be used as a dispersing medium.

In an example embodiment of the present invention, each layer forming the multi-layered structure may be formed by using the same active material components or may be formed by using different active material components.

For example, when the positive electrode includes a three-layered positive electrode active material layer, all of the first positive electrode active material layer, the second positive electrode active material layer and the third positive electrode active material layer coated on the positive electrode collector may be formed by using the same positive electrode active material slurry. That is, the first positive electrode active material layer, the second positive electrode active material layer and the third positive electrode active material layer may be formed by using a positive electrode active material slurry obtained by dissolving a lithium manganese oxide as the positive electrode active material, carbon black as the conductive material, and PTFE as the binder in an isopropyl alcohol solvent.

In addition, the first positive electrode active material layer, the second positive electrode active material layer and the third positive electrode active material layer may be formed by using different electrode active material slurries in the three-layered positive electrode active material layer. For example, the first positive electrode active material layer includes a lithium manganese oxide as the active material, however, the second positive electrode active material layer coated on the first positive electrode active material layer may be formed by coating a positive electrode active material including a three-component lithium transition metal oxide.

In this case, the total loading amount of the positive electrode active material layer coated on each layer may not be specifically limited, however, may be formed as a multi-layered positive electrode active material structure within the above-described loading amount range.

Preferred embodiments on the positive electrode have been described above, however, the multi-layered electrode active material structure may also be applied when the electrode is a negative electrode. The loading amount of the negative electrode active material may not be specifically defined when the electrode is the negative electrode and the negative electrode active material is formed in a multi-layered structure. However, the negative electrode active material may be preferably formed by considering the outer diameter of a battery, the discharge capacity of the negative electrode active material, the porosity, the thickness of the electrode or the battery, etc, with the loading amount of the negative electrode active material of 280 mg/25 cm$^2$ or more. More preferably, the loading amount of the negative electrode active material may be 280 mg/25 cm$^2$ to 340 mg/25 cm$^2$.

Of course, the condition on the components or the loading amount of each layer in the multi-layered negative electrode active material may be the same as the explanation on the multi-layered positive electrode active material structure.

The negative electrode of the present invention may include a mixture obtained by mixing a powder including the negative electrode active material with an appropriately selected additive such as a conductive material, a binder, a filler, a dispersing agent, an ionic electronic conductive material, a pressure increasing agent, etc. on a negative electrode collector.

The negative electrode collector may be a foil manufactured by using copper, gold, nickel, a copper alloy or a combination thereof, without limitation.

In the present invention, a carbon material commonly used as a negative electrode active material may be used. The carbon material may be at least one selected from the group consisting of natural graphite, synthetic graphite, fibrous graphite, amorphous carbon and amorphous carbon coated graphite.

The conductive material may include, for example, graphite, carbon black, acetylene black, ketchen black, a carbon fiber, a metal powder, etc. The binder may include commonly used materials in a common negative electrode active material, for example, polytetrafluoroethylene, polyvinylidene fluoride, polyethylene, etc., without limitation.

A mixture of the negative electrode active material and various kinds of the additives is added in a solvent such as water or an organic solvent, and the like to obtain a slurry or a paste. The thus obtained slurry or paste may be coated on an electrode support substrate by means of a doctor blade method, etc., dried and rolled using a rolling roll, etc. to manufacture a negative electrode.

A secondary battery of the present invention may comprise a positive electrode and a negative electrode comprising the multi-layered electrode active material layer, and an electrolyte. Here, the secondary battery may be particularly, a lithium secondary battery, and the lithium secondary battery may include a lithium metal secondary battery, a lithium ion secondary battery, a lithium polymer secondary battery, a lithium ion polymer secondary battery, and the like.

A method of manufacturing an electrode including the multi-layered electrode active material of the present invention may not be specifically limited. A positive electrode or negative electrode slurry may be prepared by known methods, and the coating of the active materials on an electrode collector may be conducted by using known methods. Only when coating the electrode active material slurry on the electrode collector, the coating may be conducted by several times while satisfying the determined loading amount. More particularly, the electrode active material is coated on the electrode collector once, dried by a vacuum drying method, and a second coating process is conducted thereon to prevent the mixing of the active materials in each layer to maximize the dispersing effect of the binder in the electrode.

Further, as described above, the loading amount of the electrode active material in each layer or the kind of the electrode active material may be determined according to the necessary usage and object of the secondary battery. Only for the uppermost electrode active material layer making a contact with an electrolyte or the lowermost electrode active material layer making a contact with an electrode collector in the multi-layered electrode active material may be preferably determined to be formed by using an electrode active material having better electrochemical properties when compared with the electrode active material in other layers. That is, the kind and the loading amount of the electrode active material having a good electric conductivity may be appropriately selected by considering the properties including the specific surface area, the particle size, the electric conductivity, etc. of the electrode active material.

Accordingly, when the electrode active material may be multi-coated into a multi-layered structure, the active material layer making a direct contact with the electrode collector or the electrode active material coated on the uppermost layer in the multi-layered electrode active material forming the surface of the electrode may be coated by using an electrode active material having a relatively better electric conductivity, or by coating an electrode active material having superior electric conductivity such as an electrode active material slurry including more conductive materials or an electrode slurry having more uniform particle size. Preferably, the multi-layered electrode may be formed by multi-coating the electrode active material having the good electric conductivity on the electrode collector, or may be formed by coating the electrode active material having superior electric conductivity on the active material layer making a direct contact with the electrode collector and also on the uppermost electrode active material layer forming the surface of the electrode and by coating other electrode active material on other inner active material layers.

The method of manufacturing the secondary battery of the present invention may be commonly known methods in the art. The secondary battery may be manufactured by assembling the positive electrode, the negative electrode, and a separator inserted between them, and injecting a non-aqueous electrolyte solution.

In this case, the positive electrode and the negative electrode of the present invention may be manufactured by commonly known methods in this art. Each of the electrode slurries including each electrode active material, that is, a negative electrode active material and a positive electrode active material is prepared. The thus prepared electrode slurry is multi-coated on each current collector, and then a solvent or a dispersing medium may be removed by drying and the like, and the active material may be attached on the collector and the active materials may be attached to each other.

The multi-layered electrode active material layer may be manufactured by using the same active material component, or different active material components.

In addition, the loading amount of each active material loaded on the multi-layered electrode active material layer may be the same or different.

In addition, the multi-layered electrode active material may be formed on both of the positive electrode and/or the negative electrode, or may be formed on one of the positive electrode and the negative electrode. When the multi-layered electrode active material is formed on both of the positive electrode and the negative electrode, the number of the coating of the positive electrode and the negative electrode, that is, the number of the active material layers need not be the same but may be different.

The electrolyte applicable in the present invention may include a salt having a structure of $A^+B^-$. A+ may include an alkaline metal cation such as $Li^+$, $Na^+$, $K^+$ or a combination thereof, and B− may include an anion such as $PF_6^-$, $BF_4^-$, $Cl^-$, $Br^-$, $I^-$, $ClO_4^-$, $ASF_6^-$, $CH_3CO_2^-$, $CF_3SO_3^-$, $N(CF_3SO_2)_2^-$, $C(CF_2SO_2)_3^-$, and a combination thereof. The salt may be dissolved or dissociated in an organic solvent including propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethyl methyl carbonate (EMC), γ-butyrolactone or a mixture thereof, without limitation.

The separator may include a porous separator for blocking an inner short of both electrodes and impregnated with the electrolyte, for example, polypropylene-based, polyethylene-based, and polyolefin-based porous separator may be used without limitation.

The shape of the secondary battery, preferably, the lithium secondary battery manufactured by the above-described method may be formed into a cylindrical shape as a can, a polygonal shape or a pouch shape.

Various example embodiments will be described more fully hereinafter, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art.

Example 1

(1) Manufacture of a Positive Electrode 94 wt % of a mixed positive electrode active material obtained by mixing $Li(Ni_{1/3}Co_{1/3}Mn_{1/3})O_2$ and $Li_2MnO_4$ in a mixing ratio of 1:1, 3.5 wt % of Super-P (conductive material), and 2.5 wt % of PVdF (binder) were added in an N-methyl-2-pyrrolidone (NMP) solvent to prepare a positive electrode active material slurry.

The positive electrode active material slurry was coated on an aluminum foil with a loading amount of 260 mg/25 cm$^2$, and dried in a vacuum. Then, the positive electrode active material slurry was coated secondly with the same loading amount.

(2) Manufacture of a Negative Electrode

Synthetic graphite was used as a negative electrode active material. 94 wt % of the synthetic graphite, 1 wt % of Super-P (conductive material) and 5 wt % of PVdF (binder) were added into an NMP solvent to prepare a negative electrode active material slurry. Then, the slurry was coated on a copper foil once, dried and pressurized to manufacture a negative electrode.

(3) Manufacture of a Separator

Polypropylene was uniaxially oriented by using a dry method to manufacture a microporous separator having a melting point of 165° C., and a width of 200 mm.

(4) Manufacture of a Lithium Secondary Battery

An electrode assembly was manufactured by inserting the separator between the positive electrode and the negative electrode. Then, the electrode assembly was built in a pouch shape battery case. 1M $LiPF_6$ carbonate electrolyte solution was injected to complete a battery.

Example 2

A battery was manufactured by conducting the same method described in Example 1 except for using $Li(Ni_{1/3}Co_{1/3}Mn_{1/3})O_2$ and $LiMn_{1.9}Al_{0.1}O_4$ as the positive electrode active material.

Example 3

A battery was manufactured by conducting the same method described in Example 1 except for using $Li_{1.2}(Ni_{1/3}Co_{1/3}Mn_{1/3})_{0.8}O_2$ and $LiMn_{1.8}Al_{0.2}O_4$ as the positive electrode active material.

Example 4

A battery was manufactured by conducting the same method described in Example 1 except for using $Li_{1.1}(Ni_{0.4}Co_{0.4}Mn_{0.2})_{0.9}O_2$ and $LiMn_2O_4$ as the positive electrode active material, using the loading amount of 320 mg/25 cm$^2$ for the first coating, and using the loading amount of 200 mg/25 cm$^2$ for the second coating.

Example 5

A battery was manufactured by conducting the same method described in Example 1 except for using $Li_{1.2}(Ni_{0.5}Co_{0.3}Mn_{0.2})_{0.8}O_2$ and $LiMn_{1.8}Al_{0.2}O_4$ as the positive electrode active material, using the loading amount of 200 mg/25 cm$^2$ for the first coating, and using the loading amount of 320 mg/25 cm$^2$ for second coating.

Example 6

A battery was manufactured by conducting the same method described in Example 1 except for coating a negative electrode active material slurry on a copper foil with a loading amount of 150 mg/25 cm$^2$ and drying in a vacuum, and secondly coating the same negative electrode active material slurry with the same loading amount of 150 mg/25 cm$^2$.

Comparative Example 1

A battery was manufactured by conducting the same method described in Example 1 except for conducting a single coating instead of coating the positive electrode twice.

Tests were conducted in an accelerating pattern by increasing a charge rate and a discharge rate for the lithium secondary batteries manufactured by Examples 1 to 6 and Comparative Example 1. The discharge capacity was measured and illustrated in Table 1 below.

|  |  | Cycle No. (N) | | | | | |
| --- | --- | --- | --- | --- | --- | --- | --- |
|  |  | 0 | 100 | 200 | 300 | 400 | 500 |
| Example 1 | Capacity (mAh) | 2173 | 2100 | 2050 | 1998 | 1953 | 1940 |
|  | Capacity ratio (%) | 100 | 96.6 | 94.3 | 91.9 | 89.8 | 89 |
| Example 2 | Capacity (mAh) | 2169 | 2100 | 2048 | 1995 | 1952 | 1938 |
|  | Capacity ratio (%) | 100 | 96.8 | 94 | 91 | 89.2 | 88.6 |
| Example 3 | Capacity (mAh) | 2170 | 2102 | 2050 | 1994 | 1950 | 1936 |
|  | Capacity ratio (%) | 100 | 96 | 93.8 | 91 | 89.8 | 89.2 |

-continued

| | | Cycle No. (N) | | | | | |
|---|---|---|---|---|---|---|---|
| | | 0 | 100 | 200 | 300 | 400 | 500 |
| Example 4 | Capacity (mAh) | 2170 | 2096 | 2046 | 1992 | 1947 | 1936 |
| | Capacity ratio (%) | 100 | 96.5 | 94.2 | 91.7 | 89 | 88.2 |
| Example 5 | Capacity (mAh) | 2174 | 2094 | 2044 | 1993 | 1944 | 1935 |
| | Capacity ratio (%) | 100 | 96.3 | 94 | 91.6 | 89.4 | 89 |
| Example 6 | Capacity (mAh) | 2174 | 2090 | 2044 | 1992 | 1940 | 1933 |
| | Capacity ratio (%) | 100 | 96 | 94 | 91 | 89 | 87.9 |
| Comparative | Capacity (mAh) | 2170 | 2057 | 2005 | 1933 | 1922 | 1818 |
| Example 1 | Capacity ratio (%) | 100 | 94.8 | 92.4 | 89.1 | 88.6 | 82.7 |

The invention claimed is:

1. An electrode, comprising:
a multi-layered electrode active material layer comprising an electrode active material, a binder, and a conductive material,
wherein the electrode active material in each layer of the multi-layered electrode active material layer comprises different electrode active material components,
wherein a loading amount of the electrode active material in each layer is different,
wherein the loading amount of the electrode active material increases as the layers of the multi-layered electrode active material layer move in a direction away from an electrode collector, and
wherein the electrode active material and binder are uniformly dispersed in each layer of the multi-layered electrode active material layer.

2. The electrode of claim 1, wherein the electrode active material in a layer of the multi-layered electrode active material layer in contact with an electrode collector has a higher electric conductivity than the electrode active material in other layers of the multi-layered electrode active material layer.

3. The electrode of claim 1, wherein the electrode active material in a layer of the multi-layered electrode active material layer that is a surface layer of an electrode has a higher electric conductivity than the electrode active material in other layers of the multi-layered electrode active material layer.

4. The electrode of claim 1, wherein the electrode active material in a layer of the multi-layered electrode active material layer in contact with an electrode collector includes more amounts of the conductive material than the electrode active material in other layers of the multi-layered electrode material layer.

5. The electrode of claim 1, wherein the electrode active material in a layer of the multi-layered electrode active material layer that is a surface layer of the electrode includes more amounts of the conductive material than the electrode active material in other layers of the multi-layered electrode material layer.

6. The electrode of claim 1, wherein the electrode is a positive electrode.

7. The electrode of claim 6, wherein a total loading amount of a multi-layered positive electrode active material constituting the positive electrode is 540 mg/25 cm$^2$ to 650 mg/25 cm$^2$.

8. The electrode of claim 1, wherein the electrode is a negative electrode.

9. The electrode of claim 8, wherein a total loading amount of a multi-layered negative electrode active material constituting the negative electrode is 280 mg/25 cm$^2$ to 340 mg/25 cm$^2$.

10. A lithium secondary battery comprising the electrode according to claim 1.

11. The lithium secondary battery of claim 10, wherein the lithium secondary battery includes a positive electrode and a negative electrode, both the positive electrode and the negative electrode comprising the electrode of claim 1.

* * * * *